Sept. 12, 1967     S. O. STAGEBERG     3,340,743
VARIABLE SPEED POWER TRANSMISSION WITH FLEXIBLE
BAND AND DRIVE LINK
Filed Dec. 28, 1964     2 Sheets-Sheet 1

INVENTOR
STERLING O. STAGEBERG

BY Roy E. Vasey
ATTORNEY

INVENTOR
STERLING O. STAGEBERG

BY

ATTORNEY

United States Patent Office 3,340,743
Patented Sept. 12, 1967

3,340,743
VARIABLE SPEED POWER TRANSMISSION WITH
FLEXIBLE BAND AND DRIVE LINK
Sterling O. Stageberg, 18210 Sunset Blvd.,
Redington Shores, Fla. 33708
Filed Dec. 28, 1964, Ser. No. 421,195
12 Claims. (Cl. 74—116)

The present application is a continuation-in-part of my copending application Ser. No. 22,315, filed Apr. 14, 1960, now abandoned.

The present invention relates to an improved variable speed power transmission suitable for providing an infinitely adjustable speed output from a constant speed input, and more particularly of the type comprising a variable speed output shaft rotated in one direction by a flexible non-elastic link anchored at one end against longitudinal movement, the other end being reciprocated to drive the shaft through ratchet or overriding clutch means during drive strokes of the link, which strokes are effected by lateral displacement of the intermediate portion of the link by a rotating crank arm on an input shaft when the link is shifted to lie more or less within the orbit of the crank arm, the reciprocating end of the link being returned to the initial position of the drive strokes by a tension spring as the crank arm moves through the portion of its orbit which relaxes its force on the link. The speed variation of the output shaft occurs by selectively positioning the intermediate portion of the link toward or away from the crank axis so as to be displaced to a greater or lesser extent by the crank. In practice, a plurality of such transmission units drive a single output shaft and are actuated consecutively to provide a relatively continuous rotation of the shaft.

In transmissions of the type mentioned it is necessary to provide a substantial radius on the portion of the crank arm engaging the link so that the angle of flexure of the link will not be so sharp as to unduly weaken the link; however, when an adequate link engaging or bearing radius is provided, as the link is shifted toward the crank axis a greater length thereof winds about the crank arm and correspondingly shortens the effective length of the link causing an increase in extension of the return spring and which is considerably greater than the increase in the length of the drive stroke effected by the crank arm displacing the link. This added tension on the return spring creates a problem in transmissions required to operate at the speeds of 60 cycle electric motors which revolve at 1725 r.p.m., and higher, because invariably at one or more speed settings of the transmission the oscillating frequency of the return spring matches the rate of the power impulses imparted to the flexible link by the crank arm, resulting in a resonating condition in which the spring tension on the link is relaxed and the link becomes momentarily slack after which the link is immediately subjected to a severe jerk or whiplash by the spring action and while at or near the peak tension of the return spring on the link, the crank applies another power impulse to the link, all of which generates sudden, extreme forces which quickly effect a breakdown of either the link or the overriding clutch means. In a commercially acceptable transmission, the compactness required does not permit the use of springs of a dimension which will not resonate throughout the range of tensions applied thereto. Because of the foregoing, prior to the present invention, no variable speed drive of the type mentioned has been commercially feasible.

A principal object of the present invention is the provision of an improved power transmission of the type referred to in which the length of stretch of the return spring does not correspond to the effective foreshortening of the link when wrapped about the crank arm so that the oscillation rate of the spring will not vary widely and can be maintained outside the operating frequency of the link whereby the aforementioned destructive resonating frequencies of the return spring and link do not occur and the spring constantly exerts a return tension on the link to maintain it taut at all times.

In carrying out the invention, means are provided for compensating for the increase in length of the link wound about the crank arm so that as the length of link wound on the arm is increased, the tension of the return spring is unaffected thereby. In a preferred form of the invention means are provided to increase the effective length of the link proportional to the length thereof wound about the crank arm as the link is shifted toward the center of orbit of the crank arm, whereby the increase in tension or length of the return spring during the drive stroke of the link corresponds only to the increase in lateral deflection of the link.

Another object of the invention is the provision of an improved means to move the anchored end of the flexible link laterally with respect to the crank arm orbit so that the reaction to the tensile force applied to the link by the crank arm is substantially entirely transmitted to the frame of the transmission in a manner which negates any appreciable tendency to move the anchored end of the link laterally whereby the link can be shifted to vary the speed of the output with the use of but a nominal force.

Other objects and advantages of the invention will be apparent from the following description of preferred embodiments of the invention, reference being made to the accompanying drawings wherein, FIG. 1 is a side elevational view of one form of an infinitely variable speed transmission device embodying the invention and shown connected with a constant speed motor;

Figure 1:
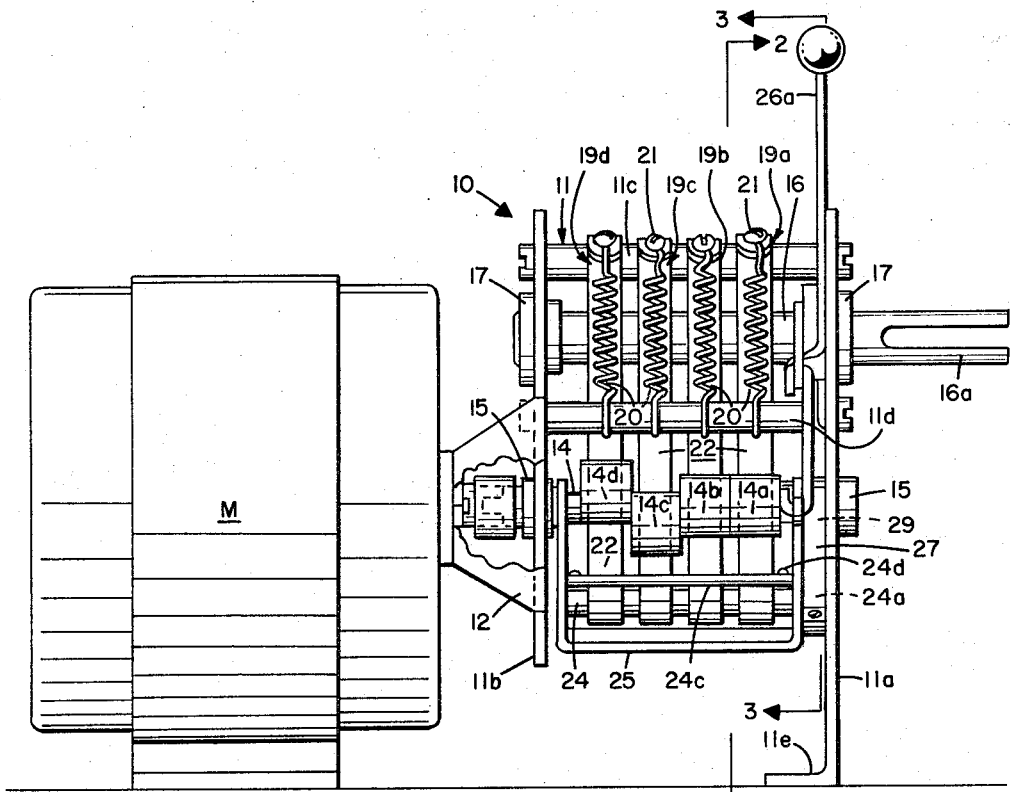

Referring to FIGS. 1 to 5, a speed transmission 10 is shown attached to an electric constant speed motor M and is adapted to provide an infinitely variable speed output, including a zero speed. It is to be understood that the transmission could be used with any other suitable power source.

Transmission 10 comprises a frame 11 including two opposed upright plates 11a and 11b which are rigidly spaced apart by tie bars 11c and 11d. Plate 11a has an inturned foot 11e which supports one end of the transmission on a suitable support surface and the other end of the transmission is supported by the motor housing through a bracket 12 suitably attached to plate 11b and the motor housing.

The armature of the motor is keyed to an input shaft 14 journaled in end bearings 15 supported in plates 11a and 11b, and which input shaft has four eccentrics or crank arms 14a, 14b, 14c and 14d formed thereon, the two end eccentrics being at 90° to one another and the two inner eccentrics being at 180° to the respective adjacent end eccentrics. Preferably, the eccentrics each have a cylindrical baring member 14e which rotates freely on needle bearings, not shown, for a purpose made clear hereinafter.

Figure 2:
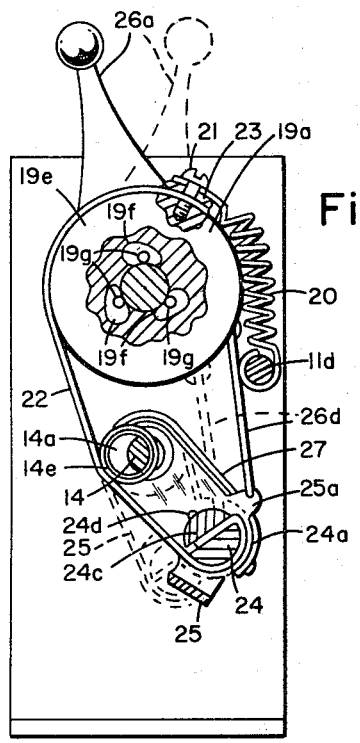
FIG. 2 is a view taken substantially along line 2—2 of FIG. 1.

An output shaft 16 is journaled in suitable bearings 17 in plates 11a and 11b and has an output end form 16a suitable for coupling a load to be driven from zero to an infinite number of selected speeds. Shaft 16 is driven by four transmission units 19a, 19b, 19c and 19d all of which are of like construction, and for convenience only unit 19a is described in detail. Referring to FIG. 2, transmission unit 19a comprises a disc 19e having an axial opening through which drive shaft 16 rotatably passes. Three wedge shaped recesses 19f are formed about the central opening and each recess contains a steel roller 19g which is wedged between the narrow end of the recesses and the shaft, when the clutch disc is rotated counterclockwise to form a driving connection between the disc and the shaft and which is released from the shaft when the disc rotates clockwise. The form of overriding or ratchet clutch shown is of well known construction and any other suitable type of overrunning clutch could be employed.

Clutch disc 19a is adapted to be oscillated to drive shaft 16 in alternate oscillation movements and is biased in a clockwise direction as seen in FIG. 2 by a tension spring 20, one end of which is attached to tie bar 11d and the other end of which is attached to the disc by a screw 21. The clutch disc is rotated counterclockwise in a power or shaft driving stroke, as viewed in FIG. 2, by a flexible non-elastic link or band 22 one end of which is attached to the clutch disc by screw 21, a washer 23 being interposed between the end of spring 20 and the band. The opposite end of the band is anchored to a bar 24 supported by the sides of a U-shaped arm 25, the extended ends of the legs of which are journaled on shaft 14 so that the arm may be positioned at various angles about the axis of the shaft. The bar 24 is semi-cylindrical and is journaled in the legs of arm 25 adjacent the yoke thereof and has a drum portion 24a extending beyond the right hand leg of the arm as viewed in FIG. 1. Bar 24 has a flat side against which an end portion of the bands 22 of the clutches are clamped by a semi-cylindrical clamp member 24c screwed to the bar by screws 24d and the bands 22 of the clutches are aligned to engage the bearings 14e of the respective eccentrics 14a, 14b, 14c and 14d. The diameter of bar 24 with clamp 24c attached thereto is substantially the same as the diameter of bearing 14e of the eccentrics.

As may be seen by referring to FIGS. 2 to 5 arm 25 can be swung to bring the bands or links 22 more or less into the orbits of crank arms or eccentrics 14a, 14b, 14c and 14d, respectively, thereby causing more or less deflection of the links by the eccentrics and therefore a corresponding change in speed and length of the clockwise shaft driving movements of the respective clutches. It will be seen that the clutch disc 19a will oscillate at the rate of rotation of the eccentric 14a, one movement being effected by deflection of the link and the other movement by tension of spring 20. When arm 25 is in the position shown in dotted lines in FIG. 2, crank arm 14a is tangent to link 22 and no deflection thereof occurs so that the power output at shaft 16 is zero. It is important that the oscillation frequency of the spring 20 be maintained different than the r.p.m. of the eccentric so that a continuous tension is applied to the clutch disc for maintaining the link taut. It should further be noted that the tension or length of the return spring a the end of the return oscillaional movements will depend upon the effective length of the link 20, i.e. the length from the screw 21 to the point of tangency with bar 24.

It is essential that the diameters of the eccentric bearings 14e be of sufficient radii so that as the bands 22 are moved closer to the axis of the eccentrics and a greater portion thereof is wound on these bearings, the angles at which the bands flex are not so sharp as to cause excessive wear and parting thereof.

Means are provided for manually controlling the position of arm 25 so that the links 22 can be shifted during operation of the transmission to vary the speed of output shaft 16. This means comprises a disc 26 rotatably journaled on shaft 16 and its angular position about the shaft can be shifted manually by a handle 26a. Disc 26 has a lug 26b having an opening therethrough for receiving a hooked end of a rigid wire 26d, the other end of which is similarly hooked in an opening through a tab 25a of arm 25.

Figure 5:
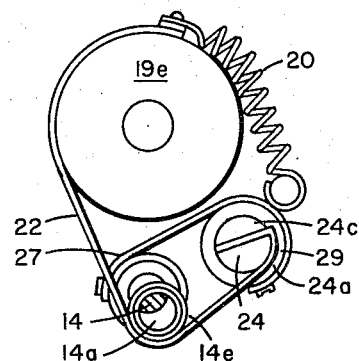

It will be seen from viewing FIGS. 2 and 5 that as arm 25 is swung to bring bands or links 22 closer to the axis of shaft 14, the length of bands engaging bearings 14e of the eccentrics increases and in prior known transmissions this length was made up by removing band length from the oscillating clutch discs, resulting in stretching of the return springs a corresponding amount. According to the present invention this increase in spring tension is obviated by furnishing added length from the anchored ends of the links 22 and in the disclosure means are provided for rotating bar 24 to unwind a length of the links therefrom corresponding to the length wound on the eccentric bearings as arm 25 is swung to move the links toward drive shaft 14. Conversely, as arm 24 is swung toward the zero speed setting, thereby unwinding the links from the eccentrics, a corresponding length of the links is wound on bar 24.

The means to rotate bar 24 as arm 25 swings comprises a flexible non-elastic band 27, one end portion of which is partially wound about drum portion 24a of bar 24 and secured thereto by a screw 28, and the other end of which band is partially wound about a drum 29, which is the same diameter as drum 24a and which is rigidly attached to frame plate 11a. Drum 29 supports a bushing 30 on arm 25 for journalling the arm on shaft 14, the band being secured to the drum by a screw 31.

Figure 3:
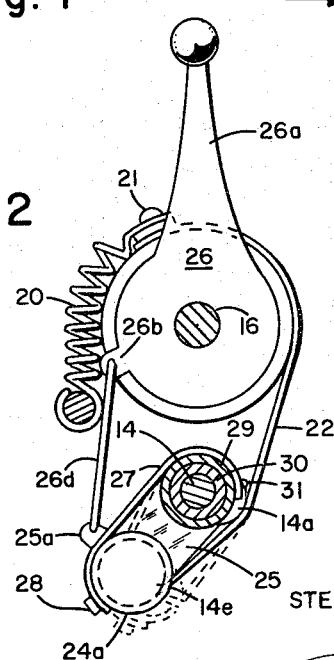
FIG. 3 is a fragmentary sectional view taken along line 3—3 of FIG. 1.
Figure 4:
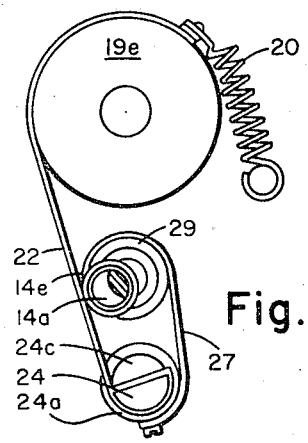
FIGS. 4 and 5 are schematic views similar to FIG. 2 showing certain parts of the transmission in different positions.

It will be seen by reference to FIG. 3 that when arm 25 is swung clockwise it moves bar 24 in a direction to carry links 22 toward the axis of crank shaft 14 thereby causing the crank arms or eccentrics thereon to displace the links laterally to a greater extent. As arm 25 swings clockwise, band 27 unwinds from hub 29 and winds onto drum 24a which permits bar 24 to rotate counterclockwise relative to arm 25 and unwind links 22 from the bar, thereby adding an effective length to each link corresponding to the length of each link wrapped about the eccentrics whereby the lengths of the return springs 20 is not appreciably affected by the latter occurrence. As arm 25 is swung counterclockwise, as viewed in FIG. 3, band 27 winds on hub 29 and unwinds from bar 24a thereby causing clockwise rotation of bar 24 which takes up or winds links 22 thereon corresponding to the lengths of the links unwound from the eccentrics. It will be seen that by the construction described, the increase in length of the bands 22 wound on the eccentrics will not change the lengths of tension springs 20 and the increase in tensions thereof will result only from the increase in deflection of the bands or links.

Another important feature of the structure just described is that the frame absorbs substantially all of the tensile force on links 22 because as may be seen in FIG. 3, the tension applied to arm 25 by link 22 tending to rotate the arm counterclockwise is counterbalanced by band 27 which is anchored to drum 29 secured to frame plate 11a. As a result the force of the tension on link 22 is applied to drum 29 along a line through the axes of bar 24 and drum 29 which drum is secured to the frame. Thus, there is no tendency for this force to act to move arm 25 in one direction or the other about its axis and the arm can be easily shifted to achieve different speed settings while the transmission is in operation.

It may be desirable to prevent the tendency of control lever 26a to shift due to vibration or the like, and suitable clamp means (not shown) may be provided for locking the control lever in whatever position it is placed.

By nullifying the effect of the winding of the links 22 in the eccentrics it is a relatively simple matter to select springs 20 having dimensions suitable for the compact structure required in commercial transmissions and which will operate at non-resonating frequencies of oscillation relative to the oscillations imparted to the links by the crank arms throughout the speed variation range.

Figure 6:
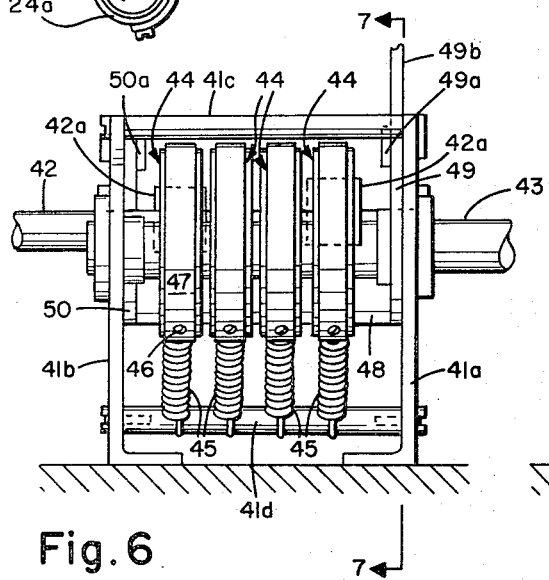
FIG. 6 is an end elevational view of another form of speed transmission device embodying the invention.
Figure 7:
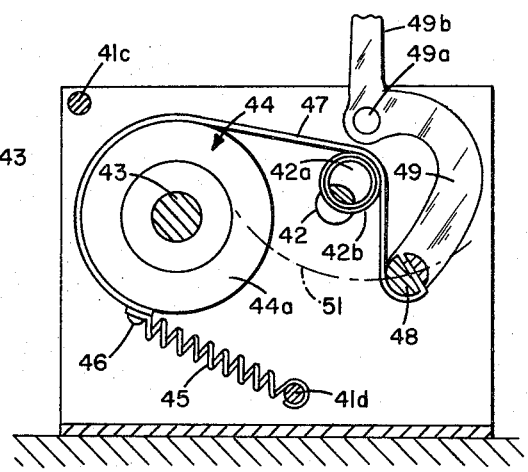
FIG. 7 is a sectional view taken along line 7—7 of FIG. 6.
Figure 8:
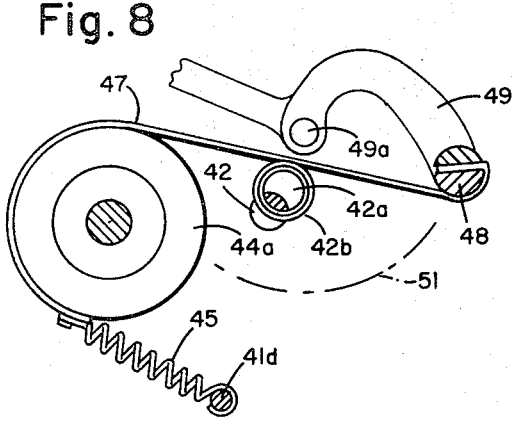
FIGS. 8 and 9 are schematic views of certain parts of the transmission shown in FIGS. 5 and 6, but in different positions.

A second form of a variable speed power transmission embodying the invention is shown in FIGS. 6 through 8 and it comprises a frame formed of two space plates 41a and 41b rigidly spaced apart by tie bars 41c and 41d. The side plates have inturned bottom flanges on which the transmission rests.

An input shaft 42 is suitably journaled in the frame plates and has four eccentrics or crank arms 42a (only two of which appear in the drawings) formed thereon, which eccentrics are located in the same angular spaced relation as described with reference to the eccentrics 14a–14d and each has a roller bearing collar 42b which rotates freely to provide a low friction connection between the eccentrics and the links engaged thereby. The input shaft is adapted to be connected to a suitable drive (not shown) such as a constant speed AC electric motor drive shaft.

Figure 9:
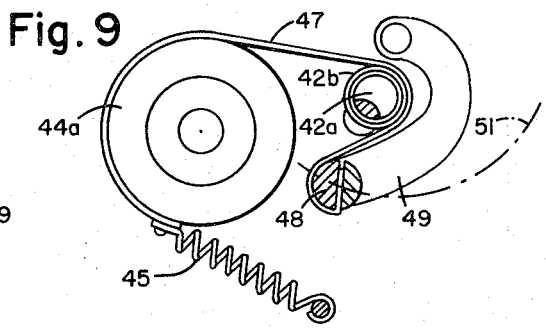

An output shaft 43 is suitably journaled between the frame plates 41a and 41b and is arranged to be driven by four transmission units 44c, each of which includes an overriding or ratchet clutch means which is like clutch 19a described hereinbefore and which is operative when rotated clockwise, as viewed in FIG. 7, to engage shaft 43 to effect rotation thereof and to rotate counterclockwise free of the shaft. For simplicity of description only one transmission unit is described in detail because the other transmission units driving shaft 43 are of like construction. The unit comprises a clutch disc 44a which is biased continually in a counterclockwise direction by a tension spring 45 secured at one end to the clutch disc by a screw 46 and the other end of which is anchored on tie bar 41d. Clutch disc 44a is rotated clockwise by a flexible non-elastic link or band 47 which is partially wound about the clutch disc and is attached thereto by screw 46 and the opposite end protion thereof is partially wound about a semi-cylindrical rod 48 having its ends attached to two crescent shaped arms 49 and 50 which are journaled to plates 41a and 41b respectively at 49a and 50a so that they swing about a common axis. The ends of links 47 are rigidly attached to rod 48 by a semi-cylindrical clamp member 48a clamping an end portion of the links to the bar, the member being screwed to the bar by screws, not shown. The input shaft 42, output shaft 43 and arms 49, 50 carrying rod 48 are all positioned so that by swinging the arms about their pivots, by handle 49b on arm 49, link 47 can be moved laterally from outside to within the orbit of eccentric 42a as seen by comparison of FIGS. 7, 8 and 9 and the end of the link anchored to bar 48 describes an arc approximating an involute of the periphery of bearing 42b, the arc being shown at 51 in broken lines. This movement of link 47, and all similar links of the transmission units 44 shifts the anchored ends of the links in a direction to provide the additional lengths of links required to wrap about the eccentric so that no appreciable increase in spring tension occurs in the return springs due to the increased wrapping effect on the eccentrics; otherwise, the requirement for increase in link length would be met by drawing the link from the clutch disc which would lengthen the spring inordinately.

It will also be noted that the tensile force on bands 47 will be substantially in the direction of the axis of arms 49, 50 so that the major portion of the reaction of this force is transmitted to the frame through the arms and their pivots and but a small force tends to rotate the arms about their axis, and accordingly, the arms may be shifted manually with little effort.

It will be seen that in both forms of the invention disclosed, the increase in tension of the return springs for the oscillating drive clutches is minimized so that the natural oscillating frequencies of the springs of relatively small dimensions can be selected which will not resonate with the frequencies of the drive bands or links so that destructive whip lashes are avoided.

While but two forms of the invention are shown, other forms, modifications and adaptations thereof may be provided, all falling within the scope of the claims which follow.

I claim:
1. A variable speed transmission comprising:
   (a) a frame,
   (b) an input shaft journaled in said frame,
   (c) an output shaft journaled in said frame,
   (d) an oscillatable clutch member supported on said output shaft, and operative to drive said shaft in one direction of its oscillational movements,
   (e) a spring urging said clutch member in the direction opposite said one direction,
   (f) a non-elastic flexible link connected at one end to said clutch member for moving said member in said one direction by tensile force applied thereto,
   (g) an eccentric on said input shaft having a bearing surface for engaging said link,
   (h) means to support the other end of said link for moving the intermediate portion of said link laterally into engagement with said eccentric and to variably position said link toward or away from the axis of rotation of said eccentric so that more or less of said intermediate portion thereof is engaged with said eccentric, and
   (i) means to modify the tension of said spring proportional to the length of said intermediate portion of said link engaged by said eccentric.

2. A variable speed transmission comprising:
   (a) a frame,
   (b) an input shaft journaled in said frame,
   (c) an output shaft journaled in said frame,
   (d) an oscillatable clutch member supported on said output shaft and operative to drive said shaft in one direction of its oscillational movements,
   (e) a spring urging said clutch member in the direction opposite said one direction,
   (f) a non-elastic flexible link connected at one end to said clutch member for moving said member in said one direction by tensile force applied thereto,
   (g) an eccentric on said input shaft, and
   (h) means to support said other end of said link for moving the intermediate portion of said link laterally toward and from the axis of rotation of said eccentric and into engagement with said eccentric, said means being operative to shift said anchored end of said link in a direction to increase the effective length of said intermediate portion of said link as said link is shifted toward said axis of rotation of said eccentric.

3. A variable speed transmission comprising:
   (a) a frame,
   (b) an input shaft journaled in said frame,
   (c) an output shaft journaled in said frame,
   (d) an oscillatable clutch member supported on said output shaft, and operative to drive said shaft in one direction of its oscillational movements,
   (e) a spring urging said clutch member in the direction opposite said one direction,
   (f) a non-elastic flexible link connected at one end to said clutch member for moving said member in said one direction by tensile force applied thereto,
   (g) an eccentric on said input shaft having a bearing surface for engaging said link, and
   (h) means to support the other end of said link for moving the intermediate portion of said link laterally into engagement with said eccentric and to varibly position said link toward or away from the axis of rotation of said eccentric so that more or less of said intermediate portion thereof is engaged with said eccentric, the last named means comprising, (i) an arm pivoted on said frame co-axial with said input shaft, (j) a rotatable bar carried on said arm and having its axis parallel to the axis of rotation of said eccentric, said other end of said link being attached to said bar and extending tangentially from one side thereof, (k) a band attached at one end to said bar and extending tangentially therefrom on the side opposite the side from which said link extends, and (l) a drum on said frame, the other end of said band being attached to said drum so that said band is partially wound thereon and extends tangentially therefrom.

4. A variable speed transmission as defined in claim 3 in which said drum is co-axial with the pivot for said arm.

5. A variable speed transmission comprising:
(a) a frame,
(b) an input shaft journaled in said frame,
(c) an output shaft journaled in said frame,
(d) a disc shaped oscillatable clutch member on said output shaft and operative to drive said shaft in one direction of its oscillational movements,
(e) a spring urging said clutch member in the direction opposite said one direction,
(f) a non-elastic flexible link connected at one end to said clutch member for moving said member in said one direction by tensile force applied thereto,
(g) an eccentric on said input shaft,
(h) an arcuate member movable in a plane normal to the axis of rotation of said eccentric,
(i) means attaching the other end of said link to said arcuate member so that said link may be moved laterally by said arcuate member toward and away from the axis of said eccentric and into engagement with said eccentric while maintaining said link tangential with said clutch member and arcuate member, and
(j) means for increasing the length of said link intermediate said points of tangency as said link is moved by said arcuate member toward the axis of said eccentric.

6. A variable speed transmission comprising:
(a) a frame,
(b) an input shaft journaled in said frame,
(c) an output shaft journaled in said frame,
(d) a disc shaped oscillatable clutch member on said output shaft and operative to drive said shaft in one direction of its oscillational movements,
(e) a spring urging said clutch member in the direction opposite said one direction,
(f) a non-elastic flexible link connected at one end to said clutch member for moving said member in said one direction by tensile force applied thereto,
(g) an eccentric on said input shaft,
(h) an arcuate member movable in a plane normal to the axis of rotation of said eccentric,
(i) means attaching the other end of said link to said arcuate member so that said link may be moved laterally by said arcuate member toward and away from the axis of said eccentric and into engagement with said eccentric while maintaining said link tangential with said clutch member and arcuate member, and
(j) means for rotating said arcuate member in a direction to unwind a portion of said link therefrom as said arcuate member moves said link laterally toward the axis of said eccentric.

7. A variable speed transmission comprising:
(a) a frame,
(b) an input shaft journaled in said frame,
(c) an output shaft journaled in said frame,
(d) a disc shaped oscillatable clutch member on said output shaft and operative to drive said shaft in one direction of its oscillational movements,
(e) a spring urging said clutch member in the direction opposite said one direction,
(f) a non-elastic flexible link connected at one end to said clutch member for moving said member in said one direction by tensile force applied thereto,
(g) an eccentric on said input shaft,
(h) an arcuate member movable in a plane normal to the axis of rotation of said eccentric,
(i) means attaching the other end of said link to said arcuate member so that said link may be moved laterally by said arcuate member toward and away from the axis of said eccentric and into engagement with said eccentric while maintaining said link tangential with said clutch member and arcuate member, and
(j) means for shifting said arcuate member in an arc lying in a plane normal to the axis of said eccentric and approximating an involute of said eccentric.

8. A variable speed transmission comprising:
(a) an oscillatable clutch member,
(b) a flexible band attached at one end thereof to said member for moving said member in one direction of its oscillation,
(c) an eccentric rotatable about a given axis and engageable by an intermediate portion of said link,
(d) anchor means for securing the other end of said link, said anchor means comprising a cylindrical member to which said other end of said link is secured, said link being partially wound about said cylindrical member in one direction, a non-elastic band attached at one end to said cylindrical member and partially wound thereabout in a direction opposite to the direction in which said link is wound on said cylindrical member,
(e) means securing the other end of said band comprising a drum shaped member having its axis parallel to the axis of said cylindrical member, and
(f) means to move said cylindrical member in an arc about the axis of said eccentric.

9. A variable speed transmission comprising:
(a) an oscillatable clutch member,
(b) a flexible band attached at one end thereof to said member for moving said member in one direction of its oscillation,
(c) an eccentric rotatable about a given axis and engageable by an intermediate portion of said link,
(d) anchor means for securing the other end of said link, said anchor means comprising a cylindrical member to which said other end of said link is secured, said link being partially wound about said cylindrical member in one direction, a non-elastic band attached at one end to said cylindrical member and partially wound about said member in a direction opposite to the direction in which said link is wound on said cylindrical member,
(e) means securing the other end of said band comprising a drum shaped member having its axis coinciding with the axis of said eccentric, and
(f) lever means to move said cylindrical member in an arc about the axis of said eccentric.

10. A variable speed transmission including:
(a) a frame,
(b) a flexible link having a load attached to one end,
(c) means to limit the other end of said link against movement toward said one end of said link, and
(d) means to intermittently deflect an intermediate portion of said link to move said load by said link, the first mentioned means comprising an arm pivotally attached at one end to said frame and having said other end portion of said link engaging the other end of said arm and extending at an acute angle to said arm, and means connected between said frame and arm to oppose turning movement of said arm by said link.

11. In a variable speed transmission including:
(a) a frame,
(b) a flexible link having a load attached to one end,
(c) means to limit the other end of said link against movement toward said one end of said link for shifting said link, and
(d) means to intermittently deflect the intermediate portion of said link to move said load by said link, the first mentioned means comprising an arm pivotally attached at one end to said frame, a rotatable member attached to said arm at the other end thereof and rotatable about an axis normal to said arm, said other end of said link being attached to said rotatable member and said link extending from said member at an acute angle to said arm and tending to rotate said rotatable member in one direction, a non-elastic flexible band having one end attached to said rotatable member, and means for attaching the other end of said band to said frame to extend at an acute angle to said arm and to tend to rotate said rotatable member in the direction opposing said link.

12. A variable speed transmission as set forth in claim 11 in which the last mentioned means comprises a drum shaped member rigidly attached to said frame co-axial with the pivot for said arm and having one end of said band attached thereto so that a portion of said band is wound and unwound from said drum as said arm is swung about its pivot.

References Cited

UNITED STATES PATENTS

| 1,067,257 | 7/1913 | Kenyon et al. | 74—140 |
| 1,635,182 | 7/1927 | Hudson et al. | 74—116 |
| 2,952,159 | 9/1960 | Regard | 74—141 |

FOREIGN PATENTS

| 9,513 | 4/1898 | Great Britain. |
| 245,419 | 4/1926 | Great Britain. |

FRED C. MATTERN, JR., *Primary Examiner.*

W. S. RATLIFF, *Assistant Examiner.*